United States Patent
Wallner et al.

(10) Patent No.: US 8,083,639 B2
(45) Date of Patent: Dec. 27, 2011

(54) METHOD FOR THE WEAR-FREE BRAKING OF A VEHICLE WITH AN ELECTRODYNAMIC DRIVE SYSTEM

(75) Inventors: Stefan Wallner, Mattsee (DE); Notker Amann, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 576 days.

(21) Appl. No.: 12/327,955

(22) Filed: Dec. 4, 2008

(65) Prior Publication Data

US 2009/0149294 A1    Jun. 11, 2009

(30) Foreign Application Priority Data

Dec. 5, 2007  (DE) .......................... 10 2007 055 706

(51) Int. Cl.
*B60W 10/08* (2006.01)
*B60W 10/02* (2006.01)

(52) U.S. Cl. ..... 477/4; 477/3; 475/2; 475/5; 180/65.285
(58) Field of Classification Search ............... 180/65.21, 180/65.28, 65.285; 475/2, 5; 477/3, 4
See application file for complete search history.

(56) References Cited

U.S. PATENT DOCUMENTS

| 6,805,648 | B1 | 10/2004 | Ehrlinger |
| 6,817,327 | B2 * | 11/2004 | Ehrlinger et al. ........ 123/179.22 |

FOREIGN PATENT DOCUMENTS

| DE | 199 34 696 A1 | 5/2001 |
| DE | 101 52 471 A1 | 5/2003 |

* cited by examiner

*Primary Examiner* — J. Allen Shriver, II
*Assistant Examiner* — Bryan Evans
(74) *Attorney, Agent, or Firm* — Davis & Bujold, P.L.L.C.

(57) ABSTRACT

A method for wear-free braking of a vehicle having an electrodynamic drive system including an electric machine and a planetary gearset with a crankshaft of the combustion engine being connected with a first element of the gearset, the electric machine connected to a second element of the gearset and a transmission input shaft connected to a carrier of the gearset. The friction clutch serves as a bridging clutch to detachably connect two elements of the gearset such that when the clutch is engaged, the gearset is locked and the combustion engine operating in thrust mode applies braking torque to the drive train, the clutch is disengaged and a transmission input speed exceeds a predetermined threshold value, the speed of the combustion engine is raised to a maximum speed by appropriate control of the electric machine.

6 Claims, 2 Drawing Sheets

METHOD FOR THE WEAR-FREE BRAKING OF A VEHICLE WITH AN ELECTRODYNAMIC DRIVE SYSTEM

This application claims priority from German Application Serial No. 10 2007 055 706.1 filed Dec. 5, 2007.

FIELD OF THE INVENTION

The present invention relates to a method for the wear-free braking of a vehicle with an electrodynamic drive system, in particular a parallel hybrid vehicle.

BACKGROUND OF THE INVENTION

From the prior art, hybrid vehicles that comprise a hybrid transmission are known. In addition to the internal combustion engine, they comprise an electric motor or electric machine. In serial hybrid vehicles, a generator is powered by the internal combustion engine and the generator supplies electrical energy to the electric motor, which drives the wheels. Furthermore, parallel hybrid vehicles are known, in which a summation of the torques of the internal combustion engine and at least one electric machine that can be connected with the internal combustion engine takes place. In such cases, the electric machines can be connected to the belt drive or to the crankshaft of the internal combustion engine. The torques produced by the internal combustion engine and/or the at least one electric machine are transmitted to the driven axle by a downstream transmission unit.

From the prior art, in the case of parallel hybrid vehicles, it is known to couple the electric machine not directly between the internal combustion engine and the transmission, but rather via a single-stage planetary gear set in a releasable manner between the combustion engine and the transmission, whereby an electro-dynamic drive system is formed.

For example, U.S. Pat. No. 6,805,648 B1 by the present Applicant, the content of the disclosure relating to the electrodynamic drive system is incorporated herein by reference and describes an electrodynamic drive system for a vehicle which comprises, between a drive engine and a main transmission; a planetary gear set that serves as a summation gear system and includes the three elements: a sun gear, a ring gear and a planetary gear carrier. In this, a first element of the planetary gear set is connected to the main transmission, a second element to the drive engine and a third element to at least one electric motor so that a wear-free starting element for the vehicle is formed.

DE 101 52 471 A1 by the present Applicant describes a method for starting an internal combustion engine of a vehicle equipped with an electrodynamic drive system, which comprises an electric machine and a planetary gear set between the internal combustion engine and a main transmission with an input shaft.

In this case, the ring gear of the planetary gear set is connected in a rotationally fixed manner to the crankshaft of the internal combustion engine via a damping device and the carrier of the planetary gear set can be connected releasably to the rotor of the electric machine, which is connected in a rotationally fixed manner with the sun gear of the planetary gear set, by way of a friction clutch. The friction clutch serves as a bridging clutch of the planetary gear set, since when the friction clutch is engaged the planetary gear set is locked.

In addition, the carrier of the planetary gear set is connected to the input shaft of the main transmission and the input shaft can be releasably coupled via a brake to a transmission housing.

Even in vehicles which comprise an electrodynamic drive system, the vehicle often has to be braked for a longer time. When this is done using the normal service brakes, there is a disadvantageous risk that the brakes will overheat and reduce the braking action. A possibility for avoiding this is to use wear-free brakes, such as retarders, but this demands more structural space and results in increased production and assembly costs.

During the normal driving operation of vehicles having an electromechanical drive system, the bridging clutch is engaged so that the planetary gear set of the electrodynamic drive system is locked. Since braking is part of normal driving operation, in such a situation, a braking torque is produced by the combustion engine, the electric machine (respectively at the same speed) or by an additional, built-in retarder.

The purpose of the present invention is to indicate a method for wear-free braking in a vehicle having an electrodynamic drive system with which the need for an additional, wear-free brake such as a retarder is eliminated.

SUMMARY OF THE INVENTION

Accordingly, a method for wear-free braking in a vehicle having an electrodynamic drive system is proposed. The electrodynamic drive system comprises an electric machine and a planetary gear set that serves as a summation gear system, such that the crankshaft of the internal combustion engine of the vehicle is connected with a first element of the planetary gear set; the electric machine with a second element of the planetary gear set and the transmission input shaft with a further element of the planetary gear set and such that a friction clutch that serves as a bridging clutch is provided, which connects two elements of the planetary gear set to one another in a releasable manner in the engaged condition of the clutch. The planetary gear set runs in locked operation in the course of which the internal combustion engine is operated at a maximum rotational speed to produce a braking torque in the drive train, the bridging clutch is opened, and the combustion engine is then raised to maximum rotation speed by appropriate control of the electric machine.

In addition, it is provided that when the transmission input speed is low, the combustion engine is not held at maximum speed since, in this case, when the bridging clutch is disengaged, the speed of the electric machine required would quantitatively exceed its maximum possible speed. For that reason, when the transmission input speed is below a predetermined threshold value, it is proposed to bring the electric machine to or keep it at its maximum speed when the bridging clutch is disengaged.

The braking effect is produced by the combustion engine, increasing its speed by way of the electric machine serves to increase the braking power. During this the braking torque of the combustion engine remains almost constant and the braking power is increased by increasing the speed.

BRIEF DESCRIPTION OF THE DRAWINGS

The invention will now be described, by way of example, with reference to the accompanying drawings in which.

DETAILED DESCRIPTION OF THE INVENTION

Figure 1:
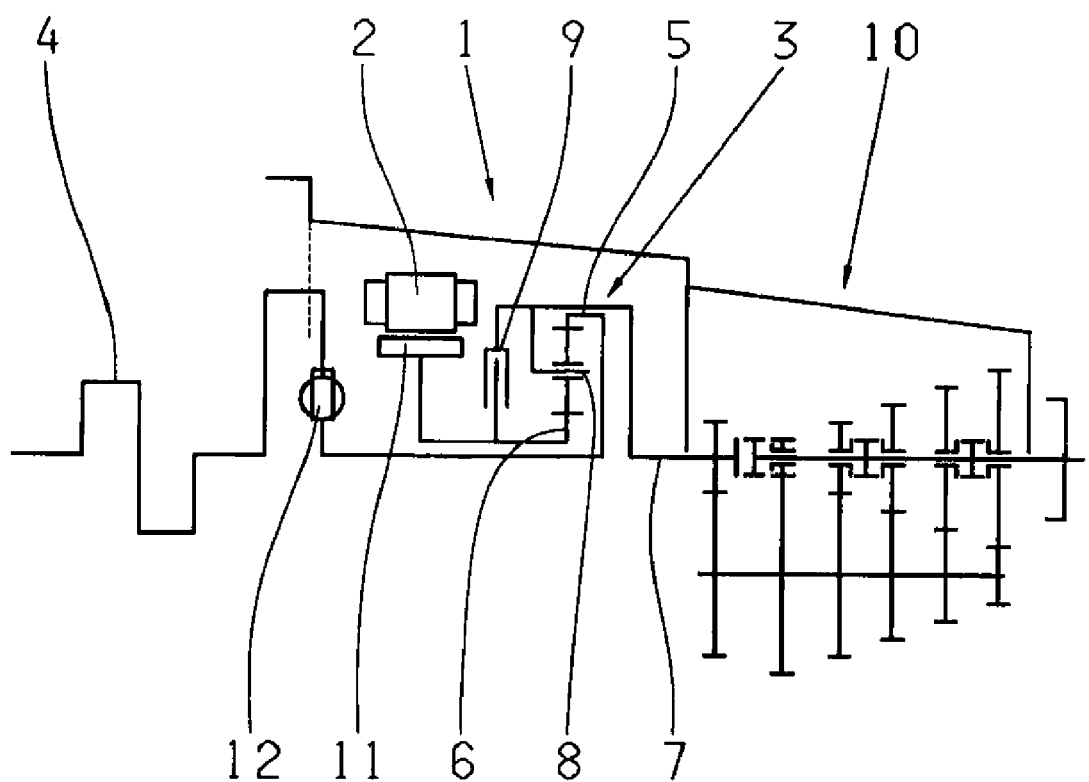
FIG. 1 is a schematic representation of an electrodynamic drive system and its arrangement.

An electrodynamic drive system 1, shown in FIG. 1, is arranged between the internal combustion engine (not shown)

of the vehicle and the vehicle's transmission 10, which is preferably made as a change-speed transmission and comprises an electric machine 2 and a planetary gear set 3 that serves as a summation gear system.

As can be seen from FIG. 1, a crankshaft 4 of the vehicle's combustion engine is connected, via a damping device 12, to a ring gear 5 of the planetary gear set 3. A rotor 11 of the electric machine 2 is connected to the sun gear 6 of the planetary gear set 3 and a transmission input shaft 7 is connected to a carrier 8 of the planetary gear set. In addition a friction clutch 9 that serves as a bridging clutch is provided, which connects the solar gear 6 and the carrier 8 of the planetary gear set releasably with one another, so that when the clutch 9 is engaged the planetary gear set 3 runs in locked operation.

By disengaging the bridging clutch 9, the speeds of the combustion engine and the electric machine 2 are uncoupled. As already described, for wear-free braking, in a next step, the rotational speed of the combustion engine is raised to a maximum. This is done by controlling the electric machine 2 specifically so that the combustion engine reaches its maximum speed. In the planetary gear set 3, serving as a summation gear system, the following relationship then applies:

$$n\_EM = n\_GE * (1 - iPlanetRatio) + iPlanetRatio * n\_VM$$

where n_EM is the rotational speed of the electric machine, n_GE is the rotational speed of the transmission input, n_VM is the speed of the combustion engine and iPlanetRatio is the transmission ratio of the planetary gear set. For a planetary gear set with iPlanetRatio=−2 and with n_VM_max=2600 rpm (n_VM_max being the maximum rotation speed of the combustion engine), the relationship, depicted in FIG. 2, between the speeds of the electric machine and the transmission input, when the bridging clutch 9 is disengaged, is obtained.

Figure 2:
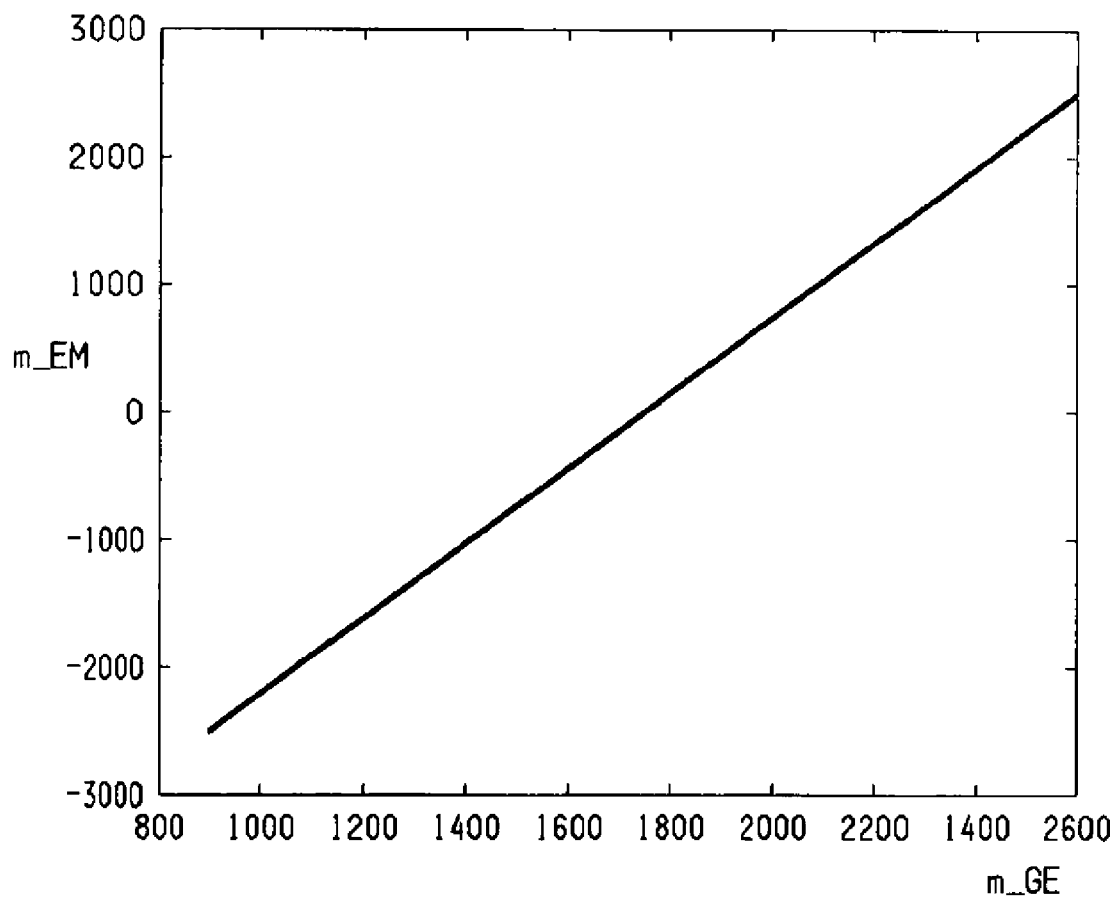
FIG. 2 is a diagram to demonstrate the relationship between the rotational speed of the electric machine and of the transmission input at maximum combustion engine speed.

With reference to the relationship, shown in FIG. 2, with a given transmission input speed and a known, desired combustion engine speed, the speed of the electric machine 2 can be pre-set specifically so that the combustion engine reaches its maximum speed.

In this way, the combustion engine can be operated at a maximum rotational speed to produce a maximum amount of braking torque. Thanks to the high speed of the combustion engine and the high braking torque that can be achieved, a very high braking power and high deceleration of the vehicle are obtained. In the example considered, at a transmission input speed of 1000 rpm, when braking by way of the combustion engine with the bridging clutch engaged, a braking power of 10 kW is obtained, whereas the inventive method provides a braking power of 27 kW.

Thanks to the inventive concept, the need to incorporate a retarder is advantageously eliminated, since powerful and wear-free braking is enabled without any loading and hence overheating of the service brakes of the vehicle.

In a variation of the method, it is provided that at low transmission input speed, the combustion engine is not held at maximum speed since, in this case, the required speed of the electric machine 2 when the bridging clutch 9 is disengaged would quantitatively exceed its maximum possible speed value. This can occur during a braking process or at the start of a braking process.

For that reason, when the transmission input speed is lower than a specified threshold value, it is proposed to bring the electric machine to or maintain it at its maximum speed so that, in this case, the speed of the combustion engine decreases with falling transmission input speed. With this procedure too, in this case a maximum braking power is achieved by the thrust operation of the combustion engine.

Preferably, the predetermined threshold value is the value of the transmission input speed below which, if the bridging clutch is disengaged and the combustion engine is running at its maximum speed, the speed of the electric machine 2 would quantitatively exceed its maximum possible rotation speed.

REFERENCE NUMERALS 1 electrodynamic drive system
2 electric machine
3 planetary gear set
4 crankshaft
5 ring gear
6 sun gear
7 transmission input shaft
8 carrier
9 friction clutch
10 transmission
11 rotor
12 damping device
n_EM rotational speed of the electric machine
n_GE rotational speed of the transmission input
n_VM speed of the combustion engine
n_VM_max maximum speed of the combustion engine
iPlantRatio transmission ratio of the planetary gear set

The invention claimed is:

1. A method for wear-free braking in a vehicle that comprises an electrodynamic drive system (1), an electric machine (2) and a planetary gearset (3), with a crankshaft (4) of an internal combustion engine of the vehicle being connected with a first element (5) of the planetary gearset (3), the electric machine (2) being connected with a second element (6) of the planetary gearset (3) and a transmission input shaft (7) being connected with a third element (8) of the planetary gear system (3), the method comprising the steps of:

providing a friction clutch (9), which serves as a bridging clutch, for connecting two elements of the planetary gear system (3) with one another in a releasable manner where, when the friction clutch (9) is engaged, the planetary gear system (3) rotates in block condition; and when the combustion engine is operating, operating the combustion engine to produce a braking torque in a drive train when a transmission input speed (n_GE) exceeds a predetermined threshold value by disengaging the bridging clutch (9) and raising the combustion engine rotation speed to a maximum speed by appropriate control of the electric machine (2); and one of bringing the electric machine (2) up to a maximum rotation speed when the transmission input speed (n_GE) exceeds the predetermined threshold value and holding the electric machine (2) at a maximum rotation speed when the transmission input speed (n_GE) is lower than the threshold value.

2. The method according to claim 1, further comprising the step of defining the predetermined threshold value as a value of the transmission input speed below which, when the bridging clutch (9) is disengaged and the combustion engine is at its maximum speed, the speed of the electric machine (2) would quantitatively exceed its maximum possible value.

3. The method according to claim 1, further comprising the step of connecting the crankshaft (4) of the combustion engine of the vehicle, via a damping device (12), with a ring gear (5) of the planetary gear system (3), connecting a rotor (11) of the electric machine (2) with a sun gear (6) of the planetary gear system (3) and connecting the transmission input shaft (7) with a carrier (8) of the planetary gear system (3), and the friction clutch (9) coupling the sun gear (6) and the carrier (8) of the planetary gear system (3) in a releasable manner.

4. The method according to claim 1, wherein the relationship between the maximum rotational speed of the electric machine (2) and the maximum rotational speed of the combustion engine is expressed by:

$$n\_EM = n\_GE * (1 - iPlanetRatio) + iPlanetRatio * n\_VM,$$

where
- n_EM is the rotational speed of the electric machine,
- n_GE is the rotational speed of the transmission input,
- n_VM is the rotational speed of the combustion engine, and
- iPlanetRatio is the transmission ratio of the planetary gear set.

5. A method of deceleration of the vehicle due to wear-free braking of the vehicle wear-free braking in a vehicle that comprises an electrodynamic drive system (1), an electric machine (2) and a planetary gearset (3), with a crankshaft (4) of an internal combustion engine of the vehicle being connected with a first element (5) of the planetary gearset (3), the electric machine (2) being connected with a second element (6) of the planetary gearset (3) and a transmission input shaft (7) being connected with a third element (8) of the planetary gear system (3), the method comprising the steps of:
- providing a friction clutch (9), which serves as a bridging clutch, for connecting two elements of the planetary gear system (3) with one another in a releasable manner where, when the friction clutch (9) is engaged, the planetary gear system (3) rotates in block condition; and
- when the combustion engine operating and a transmission input speed (n_GE) exceeds a predetermined threshold value and engine braking of the vehicle is desired:
  - disengaging the bridging clutch (9);
  - controlling the electric machine (2) so as to increase a rotational speed of the operating combustion engine to a maximum speed and thus a maximum amount of braking torque which provides improved deceleration of the vehicle due to wear-free braking of the vehicle; and
  - one of bringing the electric machine (2) up to a maximum rotation speed when the transmission input speed (n_GE) exceeds the predetermined threshold value or holding the electric machine (2) at a maximum rotation speed when the transmission input speed (n_GE) is lower than the threshold value.

6. A method for wear-free braking in a vehicle that comprises an electrodynamic drive system (1), an electric machine (2) and a planetary gearset (3), with a crankshaft (4) of an internal combustion engine of the vehicle being connected with a first element (5) of the planetary gearset (3), the electric machine (2) being connected with a second element (6) of the planetary gearset (3) and a transmission input shaft (7) being connected with a third element (8) of the planetary gear system (3), the method comprising the steps of:
- providing a friction clutch (9), which serves as a bridging clutch, for connecting two elements of the planetary gear system (3) with one another in a releasable manner where, when the friction clutch (9) is engaged, the planetary gear system (3) rotates in block condition; and
- when the combustion engine operating and a transmission input speed (n_GE) exceeds a predetermined threshold value and engine braking of the vehicle is desired:
  - disengaging the bridging clutch (9);
  - controlling the electric machine (2) so as to increase a rotational speed of the operating combustion engine to a maximum speed and thus a maximum amount of braking torque which provides improved deceleration of the vehicle; and
  - one of bringing the electric machine (2) up to a maximum rotation speed when the transmission input speed (n_GE) exceeds the predetermined threshold value or holding the electric machine (2) at a maximum rotation speed when the transmission input speed (n_GE) is lower than the threshold value, and the relationship between the maximum rotational speed of the electric machine (2) and the maximum rotational speed of the combustion engine is expressed by:

$$n\_EM = n\_GE * (1 - iPlanetRatio) + iPlanetRatio * n\_VM,$$

where
- n_EM is the rotational speed of the electric machine,
- n_GE is the rotational speed of the transmission input,
- n_VM is the rotational speed of the combustion engine, and
- iPlanetRatio is the transmission ratio of the planetary gear set.

* * * * *